July 12, 1966  E. R. LANG  3,260,871

STEP MOTOR FOR USE WITH AN INDICATOR

Filed Feb. 12, 1964  2 Sheets-Sheet 1

INVENTOR.
ELLIOT R. LANG

BY Weingarten, Orenbuch & Pandiscio

ATTORNEYS

July 12, 1966 E. R. LANG 3,260,871
STEP MOTOR FOR USE WITH AN INDICATOR
Filed Feb. 12, 1964 2 Sheets-Sheet 2
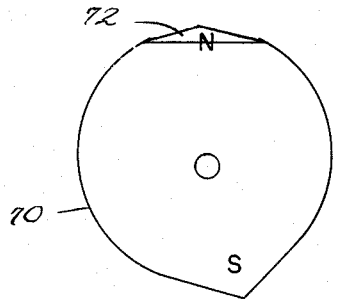
FIG. 6A
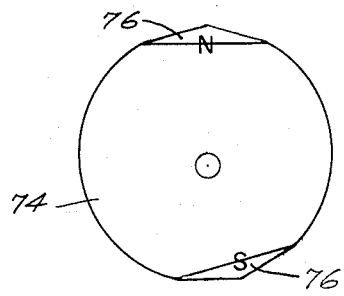
FIG. 6B
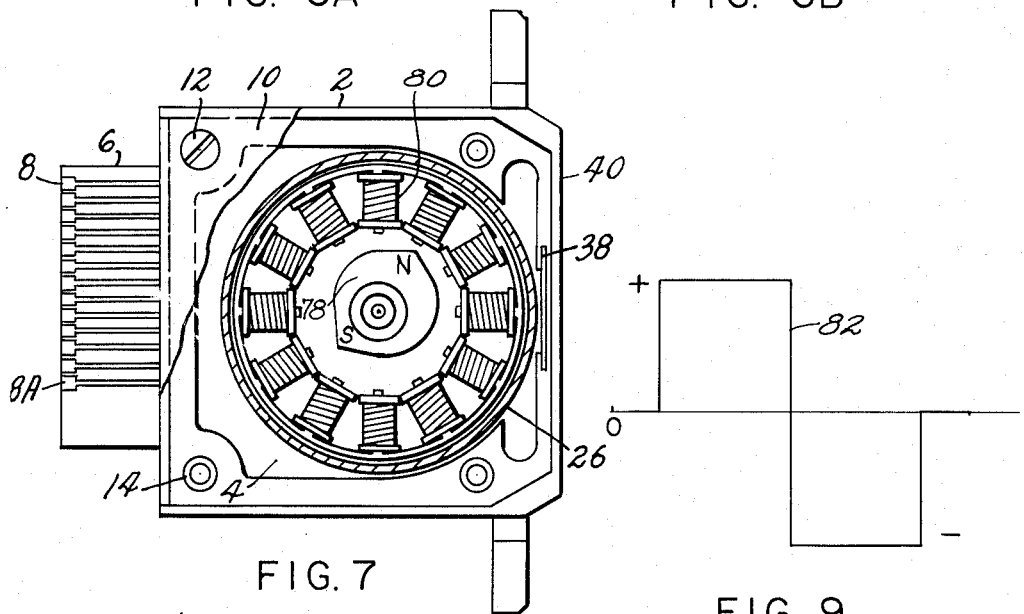
FIG. 7
FIG. 9
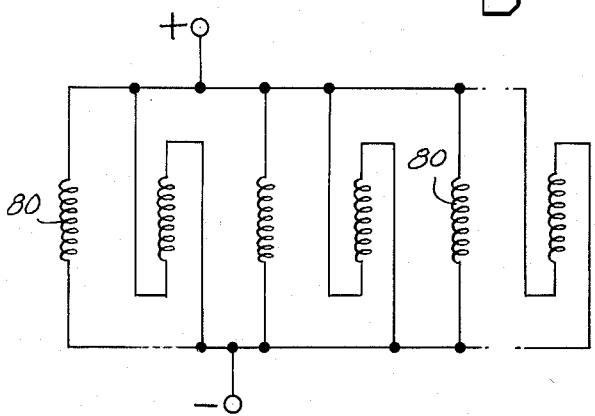
FIG. 8
INVENTOR.
ELLIOT R. LANG
BY
Weingarten, Ombach Pandiscio
ATTORNEYS

United States Patent Office 3,260,871
Patented July 12, 1966

3,260,871
STEP MOTOR FOR USE WITH AN INDICATOR
Elliot R. Lang, Hamden, Conn., assignor to The Patent Button Company, Waterbury, Conn., a corporation of Connecticut
Filed Feb. 12, 1964, Ser. No. 344,337
3 Claims. (Cl. 310—49)

This invention relates to electromagnetic indicators and more particularly to an improvement in indicators of the kind wherein a rotatable drum with indicia thereon is selectively positioned by the interaction and influence of a selectively applied magnetic field on a rotatable magnet.

As is demonstrated by U.S. Patent No. 2,908,900, issued to B. M. Gordon et al. on October 13, 1959, an operative electromagnetic indicator capable of displaying alpha-numeric designations can be made by rotatably mounting a magnet with salient poles within a circular array of separately energizable coils mounted on equally spaced pole pieces and by providing a drum with alpha-numeric indicia which is connected for rotation with the magnet. Selective energization of the coils produces different magnetic field orientations with the magnet (and drum) assuming a different position for each different field orientation. However, where the magnet must rotate 180° to display indicia located at diametrically opposite positions on the drum (for example, this occurs with any odd number of equally spaced coils which can be energized with reversible polarity or with any even number of equally spaced coils which can be energized with only one polarity), difficulty is incurred due to the fact the reversing magntic field instantaneously is symmetrically distributed relative to the magnet so that its immediate effect on the magnet is more nearly dynamic equilibrium rather than a turning moment. Although 180° reversal of the magnet may ultimately be achieved, the response is relatively slow and often the reversal movement is initiated by vibration or shock sufficient to destroy the existing equilibrium. Since response time is important, various solutions have been proposed to achieve instantaneous turning torque on 180° field reversal. One recognized solution is to provide discrete magnetic detent elements for each coil. After the rotatable magnet has been rotated by energization of a selected coil, the detent association with the coil shifts the magnet slightly to one side of true alignment with the vector of the field of the selected coil. With such an arrangement, if the field is reversed 180°, it will be distributed unsymmetrically relatively to the magnet in its detent position and thus will exert a turning force on it. This improvement is described and claimed in U.S. Patent No. 2,943,313, issued June 28, 1960, to B. M. Gordon et al. Another solution which has been proposed is to use an odd number of evenly spaced coils or to use an even number of coils mounted on pole pieces spaced according to a selected odd number spacing, with each coil energizable with a constant polarity; in both cases no two coils are 180° apart so that it is impossible to hang up on dead center. However, this proposed solution has not been a satisfactory substitute for discrete magnetic detent elements because of a tendency for the magnet to oscillate excessively on "homing" and to shift position under shock or vibrations. Furthermore in some cases an odd number of coils, or an even number of coils on pole pieces spaced according to an odd number arrangement, is not acceptable to the user.

Accordingly, the primary object of this invention is to provide an improvement in electromagnetic indicators of the kind having a rotatable magnet which avoids the need for discrete magnetic detent elements yet is capable of instant response regardless of the relative position of the magnet and the vector of the applied magnetic field.

Another primary object is to provide an electromagnetic indicator of the kind referred to above which may have an odd or even number of equally spaced coils and which is capable of instant response and of homing without excessive oscillations, all without the use of discrete magnetic detent elements.

A more specific object is to provide an electromagnetic indicator of the type described having an even number of evenly spaced coils and a magnet which is so constructed that it will respond positively when subjected to 180° reversal of a magnetic field generated by said coils.

An additional specific object is to provide an indicator of the type described having an odd number of coils or an even number of coils spaced according to an odd number arrangement, and a magnet which is constructed that it will "home" on a selected position with a minimum of oscillation and will not shift its at-rest position under shock or vibration.

The invention, both as to its construction and manner of operation, can be better understood by reference to the following detailed description when considered in connection with the accompanying drawings wherein:

FIGS. 6A and 6B show two other forms of magnets embodying the present invention;

FIG. 7 illustrates a twelve coil indicator embodying the present invention which is adapted to be used as a stepper-type indicator;

FIG. 8 illustrates the operating circuit for a stepper-type indicator; and

FIG. 9 illustrates the wave form of the operating voltage applied to the circuit of FIG. 8.

The present invention may be summarized as involving the utilization of an eccentric magnet which, in the case of an even number of coils, also is bent. As used herein the term "eccentric magnet" is intended to embrace bar magnets having an axis of rotation closer to one end than the other so that the radial gap between said other end and the surrounding circular array of coils and pole pieces is less than the corresponding gap between said one end and said circular array. The term "eccentric magnet" also is intended to embrace a "bent magnet," the latter term relating to a magnet whose opposite ends are not in mutual alignment with the pivot point thereof, i.e., the two ends are not diametrically opposed in relation to the pivot point. Further understanding of the meaning of the term "bent magnet" will be gleaned from the following specification.

Figure 1:
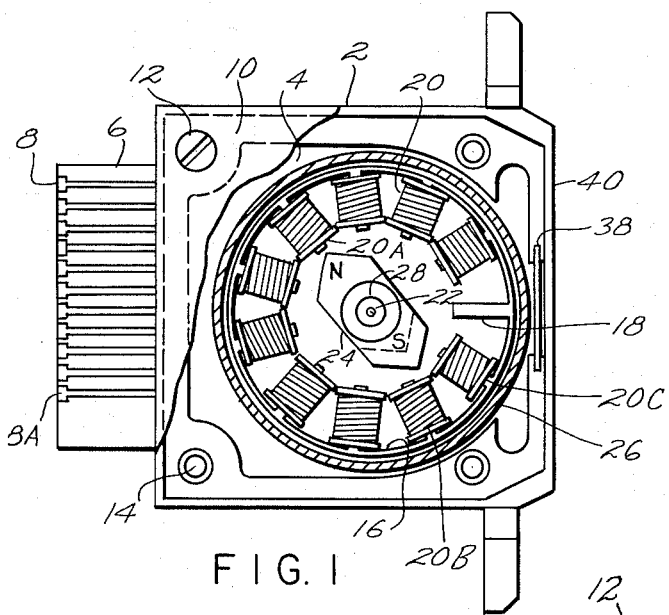
FIG. 1 is an elevational view with certain parts shown in section of a conventional electromagnetic indicator having ten coils spaced according to an odd number arrangement.

Turning now to FIG. 1, there is shown an electromagnetic indicator comprising a rectangular box-like housing 2 comprising a sidewall 4 in the form of a printed circuit board having a terminal portion 6 provided with eleven printed terminals 8. The sidewall 4 is permanently secured to the housing 2. The latter has a second sidewall in the form of a removable cover 10 which is held in place by four screws 12 which are screwed into tapped openings 14 formed at four corners of the housing.

Secured to the sidewall 4 by a suitable potting compound (not shown) is an electromagnetic stator structure comprising a circular ring 16 formed of a magnetic material having eleven radial poles 18 projecting inwardly therefrom. Mounted on ten of the poles 18 are separate electrical coil units 20 each comprising an insulated electric wire wound on a hollow spool. The eleventh pole may or may not be used. Although not shown, it is to be understood that one end of each of the wire coils is connected to a common terminal 8A. The other end of each coil is connected to a different one of the other terminals 8.

Secured to and projecting from the sidewall 4 is a pin or spindle 22 which is disposed in coaxial relationship with the circular ring 16. The pin 22 acts as a pivot support for a rotor assembly which comprises a magnet 24 and a drum 26. The drum 26 is provided with a hollow stub shaft 28 whose internal diameter is just large enough to slip onto the spindle 22. The magnet 24 is mounted on the stub shaft 28 and is firmly secured thereto so as to form a single rotor unit with drum 26. Magnet 24 has salient north and south poles identified as "N" and "S" respectively.

The drum 26 is provided with a plurality of indicia on its peripheral surface. In the illustrated embodiment the drum 26 comprises the numerals 0 to 9 and also a dash symbol (—). The aforesaid indicia is equiangularly spaced about the periphery of the drum in eleven different positions. The indicia are visible through a window 38 provided in the front wall 40 of the box-like housing 2. The position of the drum and thus the alignment of a particular numeral with window 38 is determined by the position of magnet 24. The position of the latter in turn is determined by selective energization of the coils 20. This is accomplished by a suitable power supply circuit, as for example, the circuit represented schematically in FIG. 3.

Figure 3:
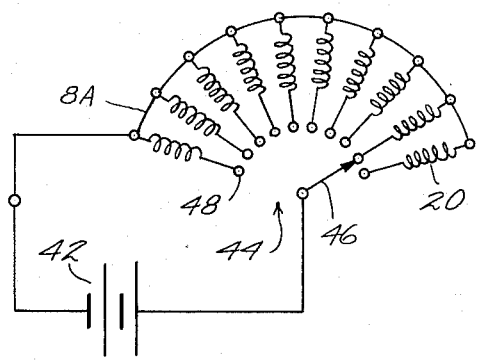
FIG. 3 is a diagram of a circuit used to operate the indicator of FIG. 1.

Referring now to FIG. 3, one end of each coil unit 20 is connected to the common terminal 8A which in turn is connected to the negative side of a battery 42. The opposite side of the battery is connected to a rotary switch identified generally at 44 which comprises a rotary switch arm 46 and ten different stationary contacts 48. Each stationary contact is connected to a different one of the coils 20 via different terminals 8. Thus by operation of the switch 44 it is possible to energize any one of the coils 20. Each coil is connected so that on energization its magnetic field has a pole at the end of the coil closest to the pivot of the rotor unit and has a north pole at the other end of the coil. Hence when a particular coil is energized, magnet 24 is attracted from whatever position it may be occupying at that instant to a position in line with the vector of the magnetic field of the energized coil, thereby causing a different one of the indicia on the periphery of the drum to be visible through window 38.

Because of the fact that the coils 20 are spaced as if there were in fact eleven rather than ten coils, the condition can never arise where the magnetic field of an energized coil is exactly 180° removed from the field of magnet 24. This is because when the north pole of the magnet is aligned with a particular coil, as for example coil 20A, the south pole of the magnet will not be aligned with another coil but will be disposed symmetrically between two other coils identified as 20B and 20C. If the coil 20B or the coil 20C should be energized when the magnet is in the position shown in FIG. 1, the resulting magnetic field will be less than 180° removed from the field of the magnet and thus will exert a turning force or torque on the latter which will cause it to rotate to a position where its north pole is in alignment with the energized coil.

While in theory the illustrated embodiment of FIG. 1 is capable of satisfactory operation, in practice it is not satisfactory for two reasons. First of all, when the magnet homes on an energized coil, it tends to oscillate excessively before coming to a dead stop. Secondly, after the magnet has been positioned and the driving coil de-energized, the magnet has a tendency to shift when subjected to shock or vibration. The reason for this unsatisfactory operation is that the magnet is symmetrical, that is, its north and south poles are equally spaced from the axis of rotation so that the gap between the north pole and the circle defined by the inner ends of the poles 18 is exactly the same as the gap between that circle and the south pole of the magnet. As a consequence, when the magnet is homing on a particular coil, its movement is determined by the attraction between its south pole and certain coils almost as much as it is by the attraction between the north pole and the energized coil. Thus as the north pole approaches the coil 20A, the south pole is attracted by both of the coil units 20B and 20C. As a result the magnet tends to oscillate with the south pole moving first towards the coil unit 20B and then towards the coil unit 20C. Eventually the magnet comes to a stop due to the attraction of its north pole to coil unit 20A and the balance between coil units 20B and 20C relative to its south pole. When the driving coil is de-energized, the magnet tends to remain in the same position. However, if the unit is vibrated or is subjected to shock, the magnet tends to move and if its movement is great enough it may assume a new at-rest position which is determined by the attraction of its south pole instead of its north pole. For example, assuming that the magnet was in the position shown in FIG. 1, the magnet might shift under vibration or shock so that the south pole becomes aligned with coil 20C. Thereupon the attraction of the pole piece of coil 20C to the south pole of the magnet would tend to keep the magnet aligned with that coil, so that the indicia previously displayed in the window would no longer be in complete registration with the window but would be slightly offset.

Figure 4:
FIG. 4 illustrates a magnet constructed according to the present invention which may be used in the indicator of FIG. 1.
Figure 2:
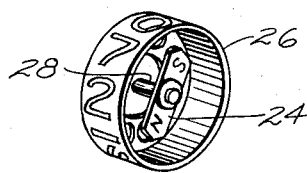
FIG. 2 is a perspective view of the drum and magnet unit of the indicator shown in FIG. 1.

I have determined that this difficulty can be overcome by using an eccentric magnet in place of the magnet 24. FIG. 4 illustrates an eccentric magnet 24A which can be substituted for magnet 24. Magnet 24A has a pivot hole 50 which is nearer its south end than its north end by a substantial amount. Consequently if magnet 24A is substituted for magnet 24 as indicated in broken lines in FIG. 1, the gap between its north end and the surrounding coils will be less than the gap at its south end. Consequently when the magnet is driven to a given position by energization of a selected coil and the driving coil is de-energized, the at-rest position of the magnet will be determined by the smaller gap at its north pole and its south pole will be almost completely ineffectual in this regard. Should the magnet tend to rotate in one direction or the other under shock or vibration, it will quickly return to its previous position.

Figure 5:
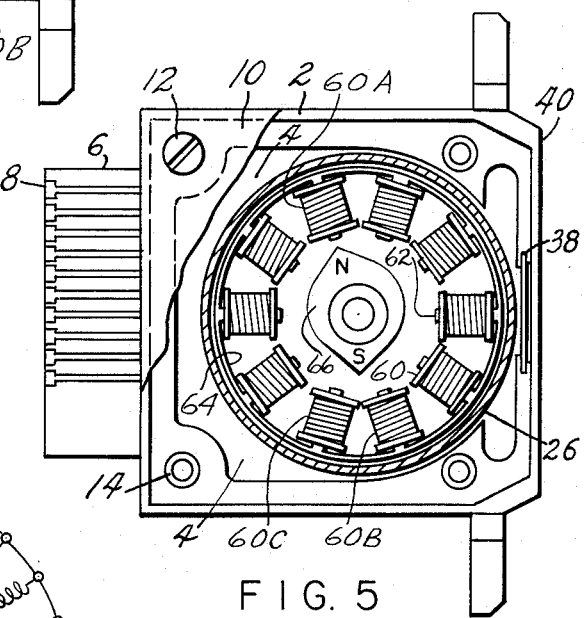
FIG. 5 illustrates a ten coil electromagnetic indicator constructed according to the present invention.

FIG. 5 shows another embodiment of the invention. The embodiment of FIG. 5 is essentially the same as the embodiment of FIG. 1 except that the stator includes ten coils 60 mounted on ten symmetrically spaced stator poles 62 formed integral with a ring 64 of magnetic material. It is believed to be apparent that if the embodiment of FIG. 5 included a magnet of the kind shown in FIG. 1 or FIG. 4, in any position determined by energization of a selected coil, one end of the magnet would be aligned with the selected coil and the other end would be aligned with a diametrically opposite coil. If subsequently the diametrically opposite coil were to be energized, the magnet would tend to remain stationary rather than instantaneously reversing its position. This would be true even with the eccentric magnet of FIG. 4. However, I have determined that this condition can be avoided by using a bent magnet 66. The magnet 66 is bent in the sense that when its north pole is aligned with a selected coil, as for example, coil 60A, its south pole will be positioned exactly half way between two other coils as, for example, coils 60B and 60C. If the coil 60B should be energized, the magnet would rotate immediately rather than remaining stationary, even though the field produced by energizing the coil 60B would be reversed 180° from the field produced by energizing coil 60A. This is due to the fact that energization of coil 60B would produce a repelling force on the south end of the magnet at an angle to a line drawn between the tip of the south pole and the pivot of the magnet; this angularly applied repelling force creates sufficient torque to effect immediate alignment of the north pole of the magnet with coil 60B.

It is to be observed that notwithstanding the use of the bent magnet, oscillation of the magnet on homing would still occur to an excessive extent if the pivot of the magnet were equally spaced with respect to its north and south poles. Therefore, in the embodiment of FIG. 5 the magnet is constructed with its pivot point closer to its south pole, so as to provide a gap between its south pole and the circular array of coils greater than the corresponding gap at its north pole. The north pole of the magnet thus will control its position to minimize oscillation on homing and prevent change of position due to shock or vibration.

While it is satisfactory to use a bent magnet having a shape corresponding generally to the shape of the magnet shown in FIG. 5, in practice it is more satisfactory to use a magnet of the construction shown in FIG. 6A. The illustrated magnet 70 is essentially a bar magnet with one end (e.g., its north end), ground flat to accommodate a soft iron pole piece 72 which is secured by soldering or by a suitable cement. The soft iron pole piece pinpoints one pole of the magnet and thereby facilitates precise positioning of the magnet in response to an applied magnetic field. While the magnet of FIG. 6A is suitable for the illustrated embodiment, it is to be understood that the magnet also may be made in three pieces as shown in FIG. 6B. Magnet 74 shown in FIG. 6B consists of a bar magnet body with a soft iron pole piece 76 attached at both ends rather than just one end. This modified form of magnet is used preferably where the coils are energized in diametrically opposed pairs. However, it also is usable where the coils are energized singly, as in the embodiments of FIGS. 1 and 5.

It is believed to be apparent from the foregoing description that the illustrated embodiments are capable of precise magnet positioning and exhibit a detent action similar to the detent action available by using discrete magnetic detent elements, but without the cost of manufacture and mounting such elements. Moreover there is a definite advantage in using the bent magnet since it permits the fabrication of an indicator providing ten different indicator positions using ten coils spaced according to a ten rather than an eleven-pole array. This is a saving in space allowing, for the same diameter of drum, larger letters or greater spacing between the letters. Alternatively it allows the use of larger coils or a reduction in the overall size of the indicator in contrast to the case where eleven coils are used or where ten are positioned on an 11-pole stator ring.

The construction of FIG. 5 has another advantage; it can be used as a stepper unit. All that is required to convert the unit of FIG. 5 to a stepper unit is to connect the coils so that the odd-numbered coils will produce a north pole when energized with a positive voltage and the even numbered coils will produce a south pole when energized with a positive voltage.

Application of the invention to a stepper unit is illustrated by FIGS. 7, 8 and 9. FIG. 7 schematically illustrates a 12-pole stator unit with a bent magnet 78 corresponding in principle of design to the one used in the unit of FIG. 5. FIG. 8 is a wiring diagram for the coils 80 carried by the 12-pole pieces of the unit of FIG. 7. FIG. 9 is an illustration of the waveform 82 of a signal applied to the circuit of FIG. 8. For convenience of description, the coils may be considered as numbered in a clockwise manner, with the last or twelfth coil occupying the 12 o'clock position. As seen in FIG. 8, every other coil is connected in reverse; the connections are such that at the tips of the pole pieces on which they are mounted, the even-numbered coils will produce a south pole when energized with a positive applied voltage and the odd-numbered coils will produce a north pole when energized with a positive voltage. Because the magnet is bent and has an air gap at its north pole smaller than that at its south pole, its stable position will always be when its north pole is facing one of the stator pole pieces.

Assuming the magnet is at rest with its north pole pointing to coil No. 1 as shown and the unit is energized with a rectangular pulse as shown in FIG. 9, it will respond in the following manner. During the first or positive half of the pulse the north pole of the magnet will be repelled by coil No. 1 and the south pole of the magnet will be attracted by the north pole of coil No. 7. This will produce a counterclockwise rotation on the magnet. The inertia of the unit and the eccentricity of the magnet will cause the latter to rotate one whole pole with the north pole pointing at coil No. 12. When the second half or negative part of the pulse occurs, coil No. 12 now becomes north and coil No. 6 becomes north. The rotor will then rotate counterclockwise and wind up with the north pole facing coil No. 11. Thus the unit of FIG. 7 will step two poles per pulse as described. It will require six steps per revolution. The same principle applies for any even number of poles. Thus a unit that would step one revolution for ten pulses would require twenty poles. An advantage of the modification illustrated in FIGS. 1 to 9 is that it is quite reliable since it has only one moving part. Additionally, in the absence of an applied signal, the rotor will remain stationary due to the detent action produced by the attraction between its north pole and an adjacent pole piece. Furthermore, like the embodiments of FIGS. 1 and 5, the stepper unit has fast response, moving almost instantaneous with energization of the coils. Perhaps the most significant advantage is that, unlike most conventional steppers, it can go from any given position back to the zero position instantaneously without having to step through successive positions.

Obviously, many modifications and variations of the present invention are possible in the light of the foregoing teachings. It is to be understood, therefore, that the invention is not limited in its application to the details of construction and arrangement of parts specifically described or illustrated, and that within the scope of the appended claims, it may be practiced otherwise than as specifically described or illustrated.

What is claimed is:

1. In an electromagnetic indicator of the type utilizing
   a stator having an annular ferromagnetic core for establishing any one of a plurality of discretely oriented magnetic fields, the core having a plurality of radial poles protruding inwardly equal distances, the stator including a plurality of windings, each winding being mounted upon a different radial pole and being arranged to be separately energized by an electrical signal, and
   a rotor having a magnet mounted to rotate within the enclosure of the annular core about a pivotal axis at the core's geometric center, the magnet having two salient poles of opposite magnetic polarity whereby the magnet rotates into substantial alignment with the magnetic field established by the stator,
   the improvement wherein:
   the salient pole magnet is mounted so that its two poles are unequal distances from the pivotal axis, and
   the radial poles are spaced around the annular core so that when one salient pole of the magnet is aligned with a radial pole the other salient pole is between two other radial poles.

2. In an electromagnetic indicator of the type utilizing
   a stator having an annular ferromagnetic core for establishing any one of a plurality of discretely oriented magnetic fields, the core having a plurality of radial poles protruding inwardly equal distances, the stator including a plurality of windings, each winding being mounted upon a different radial pole and being arranged to be separately energized by an electrical signal, and a rotor having a magnet mounted to rotate within the enclosure of the annular core about a pivotal axis at the core's geometric center, the magnet having two salient poles of opposite magnetic polarity whereby the magnet rotates into substantial alignment with the magnetic field established by the stator, the improvement wherein the two salient poles of the magnet are disposed so that one of the salient poles is offset from a straight line passing through the pivotal axis and the center of the other salient pole, and the radial poles are spaced about the annular core so that when one of the salient poles is aligned with a radial pole the other salient pole is between two other radial poles.

3. In an electromagnetic indicator of the type utilizing a stator having an annular ferromagnetic core for establishing any one of a plurality of discretely oriented magnetic fields, the core having a plurality of radial poles protruding inwardly equal distances, the stator including a plurality of windings, each winding being mounted upon a different radial pole and being arranged to be separately energized by an electrical signal, and a rotor having a magnet mounted to rotate within the enclosure of the annular core about a pivotal axis at the core's geometric center, the magnet having two salient poles of opposite magnetic polarity whereby the magnet rotates into substantial alignment with the magnetic field estabilshed by the stator, the improvement wherein:

the magnet of the rotor is mounted so that its two salient poles are unequal distances from the pivotal axis, and one of the salient poles is offset from a straight line passing through the pivotal axis and the center of the other salient pole, and the radial poles are spaced around the annular core so that when the longer salient pole is aligned with a radial pole, the shorter salient pole is between two other radial poles.

References Cited by the Examiner
UNITED STATES PATENTS

| | | | |
|---|---|---|---|
| 2,499,316 | 2/1950 | Johnson | 340—49 |
| 2,596,550 | 5/1952 | Handley. | |
| 2,908,900 | 10/1959 | Gordon et al. | 340—378 |
| 2,943,313 | 7/1960 | Gordon et al. | 340—378 |
| 3,089,131 | 5/1963 | Morgan | 340—319 |

MILTON O. HIRSCHFIELD, *Primary Examiner.*

NEIL C. READ, *Examiner.*

W. C. GLEICHMAN, J. W. GIBBS,
*Assistant Examiners.*